United States Patent [19]

Britz

[11] Patent Number: 4,909,972

[45] Date of Patent: Mar. 20, 1990

[54] METHOD AND APPARATUS FOR MAKING A SOLID FOAMED TIRE CORE

[76] Inventor: Johannes H. Britz, 28 Wilcox Avenue, Bayswater, Bloemfontein, Orange Free State, South Africa

[21] Appl. No.: 936,268

[22] Filed: Dec. 1, 1986

[30] Foreign Application Priority Data

Dec. 2, 1985 [ZA] South Africa ............. 85/9188

[51] Int. Cl.$^4$ ............ B29C 67/22; B29C 39/24; C08J 9/34
[52] U.S. Cl. ............ 264/51; 249/57; 249/154; 249/170; 264/40.1; 264/45.5; 264/46.9; 264/310; 264/337; 264/DIG. 18; 264/DIG. 67; 425/47; 425/145; 425/159; 425/426; 425/543; 425/812; 425/817 R
[58] Field of Search ...... 264/46.9, DIG. 83, DIG. 65, 264/40.1, DIG. 67, 45.5, DIG. 18; 425/543, 817 R, 47, 812, 145, 159, 426; 249/105, 154, 170, 171, 172, 57

[56] References Cited

U.S. PATENT DOCUMENTS

| | | | |
|---|---|---|---|
| 613,089 | 10/1898 | Stanton | 249/172 X |
| 639,509 | 12/1899 | Bonta | 249/172 X |
| 808,479 | 12/1905 | Riddle | 425/47 X |
| 1,455,353 | 5/1923 | Pettis | 249/172 X |
| 1,470,048 | 10/1923 | Barker | 264/45.5 X |
| 1,587,486 | 6/1926 | Marshall | 264/45.5 X |
| 1,714,710 | 5/1929 | Dalbey | 264/45.5 X |
| 1,812,792 | 6/1931 | Kilborn | 425/47 X |
| 1,840,569 | 1/1932 | Denmire | 425/47 X |
| 2,148,079 | 2/1939 | Martin, Jr. | 249/57 X |
| 2,275,591 | 3/1942 | Leonard | 425/812 X |
| 2,558,140 | 6/1951 | Kruzik | 425/47 X |
| 2,600,942 | 6/1952 | Vanacker | 425/812 X |
| 3,022,810 | 2/1962 | Lambe | 264/46.9 X |
| 3,112,785 | 12/1963 | Altorfer . | |
| 3,116,523 | 1/1964 | Barber | 249/57 |
| 3,266,099 | 8/1966 | Bucy | 425/812 X |
| 3,381,735 | 5/1966 | Talcott et al. . | |
| 3,511,736 | 5/1970 | Nielsen, Jr. et al. | 264/46.9 X |

(List continued on next page.)

FOREIGN PATENT DOCUMENTS

| | | |
|---|---|---|
| 0036693 | 9/1981 | European Pat. Off. . |
| 1936526 | 7/1969 | Fed. Rep. of Germany . |
| 2354929 | 10/1973 | Fed. Rep. of Germany . |
| 7915684 | 6/1979 | France . |
| 61-213112 | 9/1986 | Japan ............. 425/812 |
| 137488 | 4/1965 | New Zealand . |
| 150930 | 4/1969 | New Zealand . |
| 153770 | 6/1970 | New Zealand . |
| 681856 | 3/1968 | South Africa . |
| 692342 | 4/1969 | South Africa . |
| 745895 | 9/1974 | South Africa . |
| 762104 | 4/1976 | South Africa . |
| 790071 | 1/1979 | South Africa . |
| 806284 | 10/1980 | South Africa . |
| 835831 | 8/1983 | South Africa . |
| 843145 | 4/1984 | South Africa . |
| 697250 | 9/1953 | United Kingdom ........ 249/57 |
| 1216049 | 12/1970 | United Kingdom . |
| 1320052 | 6/1973 | United Kingdom . |
| 1428968 | 3/1976 | United Kingdom . |
| 2089821 | 12/1980 | United Kingdom . |
| 2104457 | 3/1983 | United Kingdom . |
| 2137639 | 10/1984 | United Kingdom . |

OTHER PUBLICATIONS

Wirtz, H., "Progress in Rim Technology for Automobile Components", in *Plastics and Rubbers Processing*, vol. 1, No. 4, Dec. 1976, pp. 167–170.

*Primary Examiner*—Philip Anderson
*Attorney, Agent, or Firm*—Curtis, Morris & Safford

[57] ABSTRACT

A method of making a solid core locatable between a wheel rim and a tire fitted to the rim, includes introducing a foamable composition into a mould cavity having a substantially inflexible mould surface. The cavity is suitably shaped so that a core locatable between a wheel rim and a tire fitted to the rim can be moulded therein. The composition is allowed to foam, thereby to fill the mould cavity. Air and excess composition is allowed to vent from the cavity via an elongate vent slit extending along a major portion of the cavity. The foamed core thus moulded in the cavity is removed from the cavity on the composition having set at least partially.

132 Claims, 3 Drawing Sheets

U.S. PATENT DOCUMENTS

| | | | |
|---|---|---|---|
| 3,605,848 | 9/1971 | Lombardi et al. | 264/46.9 X |
| 3,650,865 | 5/1972 | Hawkes et al. | |
| 3,676,028 | 7/1972 | Christie et al. | |
| 3,680,629 | 8/1972 | Gaudreau et al. | 249/172 X |
| 3,794,706 | 2/1974 | Christie et al. | |
| 3,800,015 | 3/1974 | Sachs | 249/172 X |
| 3,853,446 | 12/1974 | Hostettler et al. | 425/543 X |
| 3,854,516 | 12/1974 | Burnell | 264/46.9 X |
| 3,892,505 | 7/1975 | Doucherain et al. | 425/543 X |
| 3,915,774 | 10/1975 | Dobson | |
| 3,957,411 | 5/1976 | Schiesser | 425/DIG. 42 |
| 4,060,578 | 11/1977 | Kisbany | 264/46.6 |
| 4,071,386 | 1/1978 | Gomberg | |
| 4,124,345 | 11/1978 | Grunner et al. | 425/47 X |
| 4,248,811 | 2/1981 | Doyle et al. | 264/46.9 X |
| 4,333,899 | 6/1982 | Hogan et al. | 425/543 X |
| 4,379,104 | 4/1983 | Koorevaar | 264/46.9 X |
| 4,470,785 | 9/1984 | Koorevaar | 264/46.9 X |
| 4,588,542 | 5/1986 | Pierce | 264/46.9 X |

METHOD AND APPARATUS FOR MAKING A SOLID FOAMED TIRE CORE

THIS INVENTION relates to wheels. It relates in particular to a method of making a solid core or tube locatable between a wheel rim and a tire fitted to the rim, to a solid core when so made, and to mould apparatus for making such a solid core.

The Applicant is aware of a wheel assembly comprising a central hub, a circular rim around the hub and connected to the hub, and an inflatable tire around the rim. Optionally, an inflatable tube can be provided inside the tire. However, such a wheel assembly is prone to punctures since sharp objects such as nails can easily penetrate the tire and/or the tube causing them to deflate.

It is an object of this invention to provide a solid core or tube whereby this drawback is at least reduced.

According to a first aspect of the invention there is provided a method of making a solid core locatable between a wheel rim and a tire fitted to the rim, the method including introducing a foamable composition into a mould cavity having a substantially inflexible mould surface, the cavity being suitably shaped so that a core locatable between a wheel rim and a tire fitted to the rim can be moulded therein;

allowing the composition to foam, thereby to fill the mould cavity;

allowing air and excess composition to vent from the cavity via an elongate vent slit extending along a major portion of the cavity; and removing the foamed core thus moulded in the cavity, from the cavity on the composition having set at least partially.

The method may include exerting back pressure on excess composition venting through the vent slit. In one embodiment, the width of the slit may be substantially constant. In another embodiment, its width may vary or be non-constant.

The method may include distributing the composition evenly along the mould cavity, and the mould cavity may be inverted prior to firm setting of the composition, to ensure that the foamed composition or core has a uniform density.

The mould cavity may comprise a lower mould cavity portion and an upper mould cavity portion. In one embodiment, the introduction of the composition may be to the lower mould cavity portion, whereafter the upper mould cavity portion is mated with the lower mould cavity portion.

The mould cavity may be of annular form. The method may then include effecting the introduction of the composition via at least one feed port leading into the upper cavity portion while rotating the mould cavity portions relative to each other.

A plurality of the mould cavities, located side-by-side, may be provided. The method may then include effecting the introduction of the composition into at least two of the cavities simultaneously.

The foamable composition may comprise an admixture of a polyol, a polyisocyanate and a cross-linking agent. The core will hence be of foamed polyurethane. The mass ratio of cross-linking agent to polyol may be at least 5 to 100. The mass ratio of cross-linking agent to the polyol may be from about 10 to 100 to about 25 to 100.

In one embodiment, the polyol may be a polyester polyol. The polyester polyol may be a linear polyester polyol having primary hydroxyl groups as chain-terminating groups, and the foamed or microcellular or expanded polyurethane may be a predominantly closed-cell polyurethane.

The polyisocyanate may be a diisocyanate having a NCO content of 15% to 25%. The mass ratio of the polyisocyanate to the polyester polyol plus cross-linking agent may be at least 50:100. For example, it may be about 70:100 to about 90:100, e.g. about 80:100.

The mass ratio of the polyester polyol to the polyisocyanate may be about 1:0,8 to about 1:1,15, e.g. about 1:10,9 to 1:1,13.

The cross-linking agent may comprise one or more of the following: a chain extender, a blowing agent, a catalyst, and a surface active agent capable of stabilizing the formed structure. Preferably, it comprises an admixture of all four these components. The chain extender may comprise a short-chain hydroxyl-containing compound. The blowing agent may be water.

The foamable composition may also include a diluent. The diluent may be methylene chloride, and the mass ratio of diluent to the polyester polyol may be less than 10:100, e.g. about 2:100 to about 4:100.

The density of the moulding, i.e. the core, may be at least 100 kg/m$^3$. It may be about 250 to 500 kg/m$^3$, e.g. about 300 to 400 kg/m$^3$.

In another embodiment, the polyol may be a polyether polyol. The mass ratio of the polyisocyanate to the polyol may then be less than 50:100, e.g. about 40:100. The density of the moulding may then be about 200 kg/m$^3$ to about 500 kg/m$^3$.

The core may have an outer skin of non-foamed or non-cellular polyurethane material. In one embodiment, the core may be of substantially circular cross section. It may have sufficient resiliency so that it assumes the cross sectional shape of the space defined between the tire and rim, in use. In another embodiment, it may be non-circular, e.g. D-shaped, in cross-section.

In one embodiment, the core may be in the form of a continuous loop, i.e. of toroidal form. In another embodiment, it may be of elongate form. In use, its ends will then be joined together, e.g. by means of adhesive, prior to it being inserted into the tire.

The method may further include preheating the mould cavity to a temperature of between 25° C. and 35° C. prior to introducing the composition into the mould cavity and/or maintaining the mould cavity at a temperature of at least 25° C. to 35° C. for between 15 and 60 minutes after the composition has been introduced thereinto, to allow the material to cure.

According to a second aspect of the invention, there is provided a method of making a solid core locatable between a wheel rim and a tire fitted to the rim, the method including simultaneously introducing a foamable composition into a plurality of spaced continuous mould cavities suitably shaped so that cores locatable between a wheel rim and a tire fitted to the rim can be moulded therein;

allowing the composition to foam, thereby to fill the cavities; and removing the foamed cores thus moulded in the cavities, from the cavities on the composition having set at least partially.

According to a third aspect of the invention, there is provided a method of making a solid core locatable between a wheel rim and a tire fitted to the rim, the method including introducing a foamable composition into a first mould cavity portion via a port in a second mould cavity portion aligned with the first mould cavity portion while moving the cavity portions relative to each other, the mould cavity portions between them defining a mould cavity suitably shaped so that a core locatable between a wheel rim and a tire fitted to the rim can be moulded therein;

allowing the composition to foam, thereby to fill the cavity; and removing the foamed core thus moulded in the cavity, from the cavity on the composition having set at least partially.

The invention extends also to a solid core locatable between a wheel rim and a tire fitted to the rim, when made according to the methods as hereinbefore described.

According to a fourth aspect of the invention there is provided mould apparatus for moulding a solid core locatable between a wheel rim and a tire fitted to the rim, the apparatus including a substantially inflexible mould body providing an enclosed mould cavity suitably shaped so that a solid core locatable between a wheel rim and a tire fitted to the rim, can be moulded therein; and an elongate vent slit extending along a major portion of the mould cavity.

The vent slit or gap may extend along the entire length of the mould cavity. Back pressure means, for exerting a back pressure on excess moulding composition passing from the cavity through the slit, may be provided. The back pressure means may comprise a flange located over or spanning the slit. The flange is hence spaced from the mould cavity. In one embodiment, the width of the slit may be constant along the cavity and through the mould body. In another embodiment, its width may vary through the mould body, e.g. it may taper down from the mould cavity to the outer surface of the mould body so that its width is greater at the mould cavity than at the mould body outer surface.

The mould cavity may be annular when seen in plan view. The mould body may comprise a lower body portion having a lower mould cavity portion, and an upper body portion having an upper mould cavity portion aligned with the lower mould cavity portion so that the upper and lower mould cavity portions together define the mould cavity. The upper body portion may comprise a plurality of abutting concentric sections with the vent slit being provided along the line of abutment of the joint of the sections.

A plurality of the mould cavities, arranged in spaced concentric configuration, may be provided in the mould body. The upper mould body portion may be provided with at least one port extending into each of the mould cavities and through which a moulding composition can be introduced into the mould cavity. The upper and lower mould body portions may be rotatable relative to each other. The mould apparatus may include guide means for guiding the body portions as they rotate relative to each other.

The abutting concentric sections of the upper body portion may be in the form of rings locatable adjacent one another, thereby to define the upper mould cavity portions between them. The vent slits or gaps are then provided between adjacent portions of these rings. These portions or sides may extend at an angle to the vertical when they are mated with the lower body portion, with the lower body portion extending horizontally, so that the vent slits are then inclined at an angle to the vertical.

The rings will thus be provided with said flanges, which will hence protrude radially outwardly or inwardly from the rings, as well as peripherally around the rings.

The mould cavities may be substantially circular in cross-section. The diameters of the cross-sections of at least some of the cavities may vary. The diameters of the cavities may increase progressively from the outermost cavity to the innermost cavity, or vice versa.

In one embodiment of the invention, the upper and lower portions of each cavity may be of the same size. In another embodiment of the invention, the lower portion of at least one of the cavities may be slightly larger than its upper portion.

The apparatus may include securing means for securing the body portions together releasably. In another embodiment, the mould cavity may instead be of elongate form.

The body portions may be of metal, plastics material or the like, and the two mould portions may be hingedly attached together.

According to a fifth aspect of the invention there is provided mould apparatus for moulding a solid core locatable between a wheel rim and a tire fitted to the rim, the apparatus including a plurality of spaced continuous mould cavities, each cavity suitably shaped so that a solid core locatable between a wheel rim and a tire fitted to the rim can be moulded therein; and a vent slit leading from each cavity.

According to a sixth aspect of the invention there is provided mould apparatus for moulding a solid core locatable between a wheel rim and a tire fitted to the rim, the apparatus comprising a first mould body portion providing a first mould cavity portion;

a second mould body portion providing a second mould cavity portion aligned with the first mould cavity portion so that the cavity portions define a mould cavity shaped so that a solid core locatable between a wheel rim and a tire fitted to the rim, can be moulded therein, with the body portions being movable with respect to each other;

foamable composition feed means in or on the one body portion for feeding foamable material into the mould cavity portion of the other body portion as the body portions move relative to each other; and a vent slid leading from the cavity.

The invention will now be described by way of example with reference to the accompanying diagrammatic drawings.

Figure 1:
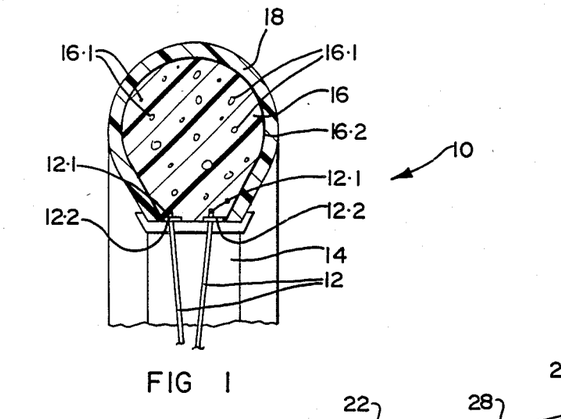
FIG. 1 shows a cross sectional view of part of a wheel assembly incorporating a solid core or tube according to the invention.

Referring to FIG. 1, reference numeral 10 generally indicates a wheel assembly.

The wheel assembly 10 includes a central hub or boss (not shown) and spokes 12 extending radially outwardly from the hub or boss. The wheel assembly 10 further includes a rim 14 around the boss or hub, the free ends 12.1 of the spokes 12 extending through apertures in the rim 14 and secured thereto by means of nuts 12.2 which engage threads provided on the ends of the spokes.

The wheel assembly 10 also includes a toroidal solid core or tube 16 around the outside of the rim 14, and a tire 18 around the core 16, so that the core 16 is located between the tire 18 and the rim 14.

The core 16 is of foamed or expanded or microcellular polyurethane material having cells or bubbles 16.1 therein. It has a surface layer or skin 16.2 of substantially non-foamed polyurethane material. The core is circular in cross-section and has a smooth outer surface. It has sufficient resilience to adopt the cross-sectional shape of the space defined between the rim and the tire. In another embodiment (not shown), its cross-sectional shape can match that of said space, i.e. it can be D-shaped in cross-section.

The wheel assembly 10 can be that of a bicycle (not shown) and may have a diameter of about 50 cm and a tire width of about 4 to 5 cm. In other embodiments (not shown) it can be that of an agricultural implement, an earth working implement, a scooter, light delivery van, motorbike or the like.

Figure 2:
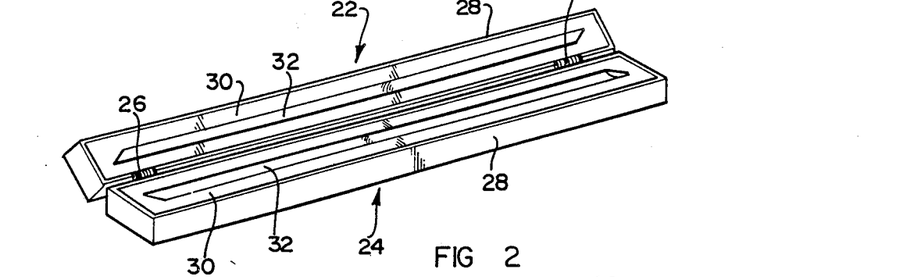
FIG. 2 shows a three dimensional view of mould apparatus, according to one embodiment of the second aspect of the invention, for use in moulding the core of FIG. 1.

Referring to FIG. 2, reference number 20 generally indicates mould apparatus for use in moulding the core 16 hereinbefore described with reference to FIG. 1.

The mould apparatus 20 comprises upper and lower mould body portions 22, 24 respectively, hingedly attached together by means of hinges 26.

Each of the portions 22, 24 comprises an outer jacket 28 of metal, for example steel, and an inner portion 30 of inflexible, non-compressible synthetic plastics material, for example relatively dense polyurethane material such as that available in South Africa from Industrial Urethanes (Pty) Limited under the trade name POLYCAST. Each of the body portions also has a mould cavity portion 32. Each of the cavity portions 32 is substantially semi-circular in cross section, and is of elongate form, with the ends of the cavity portions being angled. This permits the ends of a core 16 formed therein, to be joined together readily, to form a toroid.

To form a core 16 for a bicycle wheel, the cavity defined by the cavity portions 32, when the mould portions 22, 24 are closed, can typically have a volume of about 1.77 liters.

414 grams of a first component comprising a polyether/polyol blend, such as that available in South Africa from Industrial Urethanes (Pty) Limited, can be admixed with 158 grams of MDI ('dimethyl phenyl diisocyanate') variant, such as that available in South Africa from Industrial Urethanes (Pty) Limited, and the mixture introduced, e.g. by hand or by means of an application machine, into the cavity portion 32 of the bottom mould portion 28. If desired, the mould cavity surfaces can be coated with a release substance, prior to introduction of the composition into the cavity.

The mould portion 22 can then be closed, and releasably secured to the mould portion 24 by means of three overcentre clips (not shown) spaced apart from one another along the length of the mould 20. The apparatus 20 is turned so that the joint between the portions 22, 24, which provides an elongate vent passageway for air and excess material, is uppermost. This permits release or escape of air and excess material from the cavity, along the entire length of the cavity, thereby promoting formation of a moulding having a uniform density along its entire length. The mould 20 can be preheated to a temperature between 20° C. and 35° C., and maintained at this temperature for about 60 minutes after the components have been introduced into the cavity portion. During this period, the compositions initially react to form a foamed, expanded or cellular material in the cavity, and thereafter this material cures, i.e. a so-called cold curing process, for the remainder of this period. The mould portions can then be opened, and the moulded solid core 16 removed from the mould. It will typically have a density of about 250 kg/m$^3$, excess material having escaped from the mould cavity via the passageway formed along the joint between the mould portions 22, 24.

Prior to use in the wheel assembly 10, any excess material adhering to the core 16 can be trimmed off, and the ends thereof are then attached together by means of an adhesive, to form a loop.

The density (and hence the resilience) of the cover member 16 can be varied by varying the ratio of the first component to the second component;

varying the amount of material introduced into the mould cavity;

varying the ratio of the ingredients, and possibly the ingredients themselves, in the first and/or second components.

In another embodiment of the invention, there can instead be introduced into the cavity portion of the bottom mould portion 28, an admixture comprising 82 parts by mass of a polyester polyol, such as that available in South Africa under the trade name BAYFLEX 200KS from Bayer Limited; 18 parts by mass of a cross-linking agent comprising diols, catalyst, stabilizer and blowing agent, such as that available in South Africa under the trade name CROSS LINKING AGENT 1880A from Bayer Limited; and 82 parts by mass of a diisocyanate composition having an NCO content of about 19%, such as that available in South Africa under the trade name DESMODUR PM53 from Bayer Limited.

In yet another embodiment, the foamable composition can comprise 100 parts by mass of DALCOCEL M372 (trade name) available in South Africa from Industrial Urethanes (Pty) Limited, and 80 parts by mass of a diisocyanate composition having an NCO content of 18%, such as that available in South Africa from Industrial Urethanes (Pty) Limited under the trade name SUPRASEL VM051. DALCOCEL M372 comprises polyester polyols and a cross-linking agent made up of diols, catalyst, stabilizer, flowing agent and pigmentation.

Typically, the components can be admixed for 20-30 seconds, the admixture introduced into the mould cavity, the mould portions closed, the mould tapped with a mallet for about 2 minutes to remove air bubbles (thus also promoting uniform product density), the mould inverted (also to promote uniform product density), the moulded core removed after a further 8-10 minutes, and the core allowed to cure further for 12-24 hours.

Figure 3:
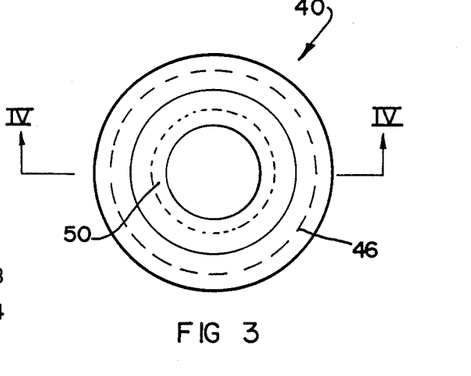
FIG. 3 shows a plan view of mould apparatus, according to another embodiment of the second aspect of the invention, for moulding the core of FIG. 1.
Figure 4:
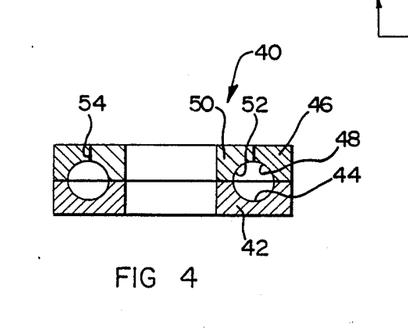
FIG. 4 shows a sectional view through IV—IV in FIG. 3.

Referring to FIGS. 3 and 4 of the drawings, reference numeral 40 generally indicates mould apparatus according to another embodiment of the second aspect of the invention.

The mould apparatus 40 comprises an annular bottom mould portion 42 having an annular mould cavity portion 44 therein. The mould cavity portion 44 is substantially semi-circular in cross section.

The mould apparatus 40 also includes an upper outer annular mould portion 46 adapted to be located on top of the mould portion 44, and having an annular mould cavity portion 48 therein.

Finally, the mould apparatus 40 includes an upper inner annular mould portion 50, having an annular mould cavity portion 52 therein. The portion 50 is also adapted to be located on top of the portion 42. The cavity portions 48, 52 together define an annular mould cavity portion which is also substantially semi-circular in cross section, when the inner and outer upper mould portions are located adjacent each other. A substantially circular section mould cavity is defined by the cavity portions 48, 52 and 44 when the mould portions 46, 50 are located in position on top of the mould portion 42.

The joint 54 between the mould portions 46, 50 provides a vent, gap, slit or passageway through which air and excess material can escape during moulding of a toroidal core 16 in the mould cavity. The gap can be of uniform width, and can be from 0,1 to 2 mm wide, e.g. 0,5 to 1,0 mm wide. In another embodiment (not shown), the gap can taper down from the cavity outwardly so that it is wider at the cavity than at the outer surface of the mould. This taper will then exert a back pressure on excess material escaping from the mould cavity, hence promoting formation of a moulding of uniform density in the cavity.

The mould portions can be of said Polycast material, or they can be any other suitable inflexible non-compressible material, e.g. metal (such as aluminium), plastics material, etc.

Figure 5:
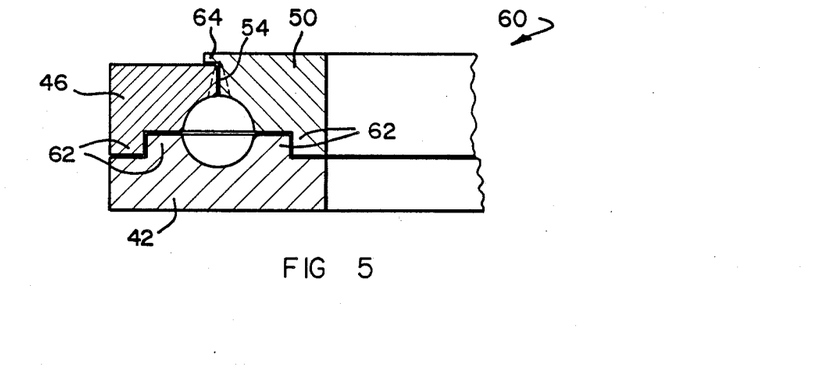
FIG. 5 shows a sectional view similar to that of FIG. 4, of mould apparatus according to yet another embodiment of the second aspect of the invention.

Referring to FIG. 5 of the drawings, reference numeral 60 generally indicates mould apparatus according to yet another embodiment of the second aspect of the invention.

Part of the apparatus 60 which are similar to those of the apparatus 40 hereinbefore described with reference to FIGS. 3 and 4, are indicated with the same reference numerals.

The mould portions 42, 46 and 50 have interengaging portions 62 to locate the portions 46, 50 in position on the portion 42.

Furthermore, the portion 50 has a radially outwardly extending peripheral flange or lip 64 closing off the passageway 54 between the mould portions 46, 50. The lip 64 exerts a back pressure on excess material escaping from the passageway, which also promotes the formation of a moulding having uniform density.

In another embodiment, the passageway or gap 54 can be of non-constant width. For example, it may taper down from the mould cavity to the outer surface of the mould, as indicated in broken line in FIG. 5. Typically, it may taper down from a width of 1-2 mm to a width of 0,5 to 1 mm. In other embodiments (not shown), it can be stepped, only one of the abutting surfaces of the portions 46, 50 can be tapered or stepped, etc. The non-constant width also serves to impose back pressure on excess foaming material being vented.

Figure 6:
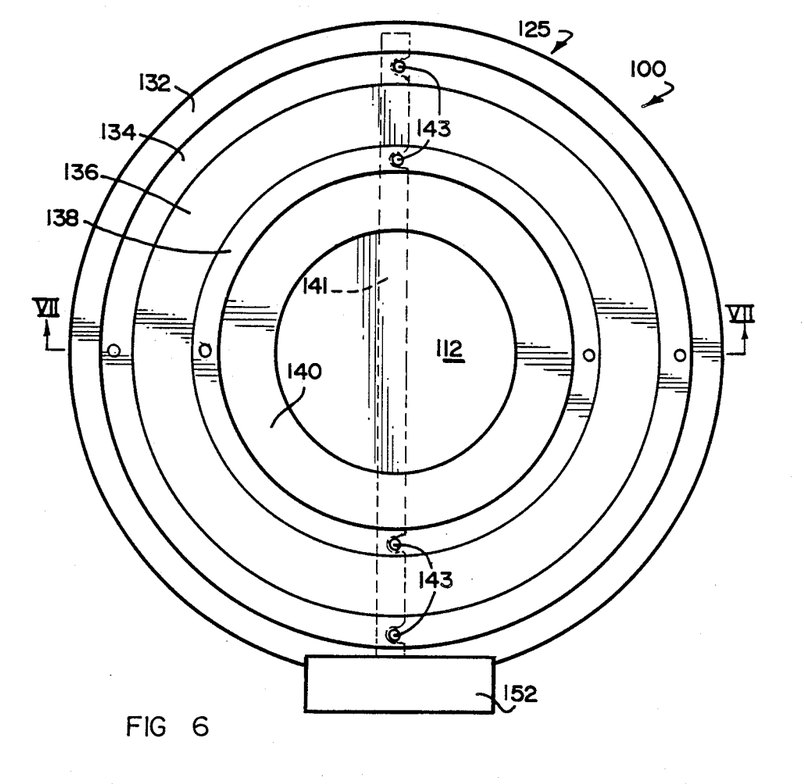
FIG. 6 shows a plan view of mould apparatus according to a further embodiment of the second aspect of the invention.
Figure 7:
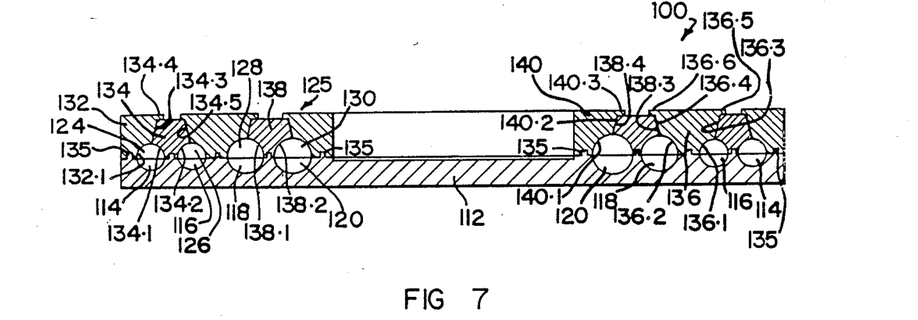
FIG. 7 shows a cross-sectional view through VII—VII in FIG. 6.
Figure 8:
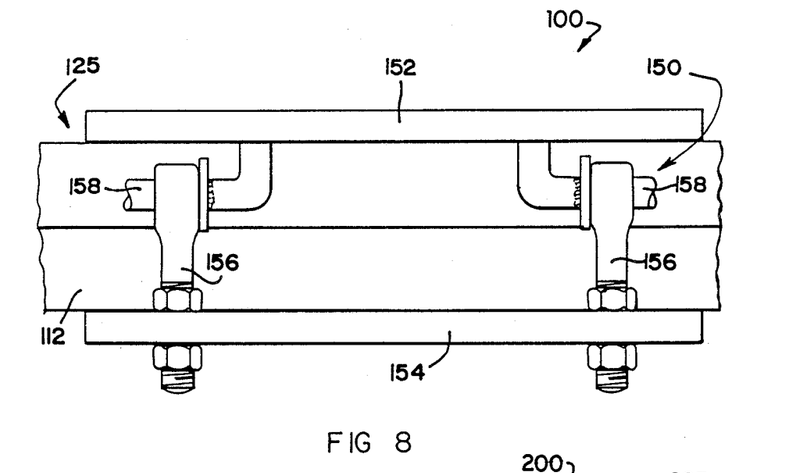
FIG. 8 shows an end view of the mould apparatus of FIG. 6.

Referring to FIGS. 6 to 8, reference numeral 100 generally indicates a mould apparatus according to a still further embodiment of the second aspect of the invention.

The apparatus 100 includes a circular lower mould body portion or base 112. In the base there are provided four mould cavity portions 114, 116, 118 and 120. The mould cavity portions are substantially annular when seen in plan view, and are spaced concentrically from one another, i.e. their diameters vary so that varying sizes of cores can be moulded in them. The mould cavity portions are substantially semi-circular in cross-section and their cross-sectional diameters vary, the diameter of the outermost cavity portion 114 being the smallest and that of the innermost cavity portion 120 being the largest.

The apparatus 100 also includes an upper mould body portion or cover, generally indicated by reference numeral 125, in which there are provided mould cavity portions 124, 126, 128 and 130 which are complementary to the mould cavity portions 114, 116, 118 and 120 respectively. In other words, the cavity portions 114, 124 define between them a substantially circular section mould cavity, as do the cavity portions 116, 126: 118, 128; 120, 130.

The cover 125 comprises an outermost ring 132 having an arcuate-shaped surface 132.1, as well as an inclined surface 132.2. It also includes an abutting ring 134 having arcuate-shaped surfaces 134.1 and 134.2, as well as an inclined surface 134.3 which matches the inclined surface 132.2 of the ring 132. A gas and excess material vent or expansion slit or passageway is provided between the inclined surfaces, sides or portions 132.2 and 134.3, and hence extends around the entire mould cavities. The ring 132 has a circumferential outwardly extending peripheral flange or lip 134.4 which spans the expansion passageway and rests on the ring 134. The ring 134 also has an inclined surface 134.5.

The cover 125 also includes a further ring 136 also having a pair of arcuate-shaped surfaces 136.1 and 136.2, a pair of spaced inclined surfaces 136.3, 136.4 and a pair of spaced radially outwardly extending peripheral flanges 136.5, 136.6.

The cover 125 further includes a ring 138 having a pair of arcuate-shaped surfaces 138.1 and 138.2, and a pair of inclined surfaces 138.3, 138.4.

Finally, the cover 125 includes an inner ring 140 having an arcuate-shaped surface 140.1, an inclined surface 140.2, and a radially outwardly extending peripheral flange 140.3.

Hence, annular expansion passageways are provided between the surfaces 132,2 and 134,3; 134,5 and 136,3; 136,4 and 138,3; and 138,4 and 140,2.

The rings fit positively onto the base 112 by means of annular ridges 135 protruding from the base into complementary annular grooves in the rings. These ridges and grooves also serve to prevent material from flowing from one cavity to the next.

To form the cover 125, the rings can be connected together by a cross-member 141 (indicated in broken line in FIG. 6), which is fixed in position by means of bolts (not shown) which screw into threaded openings 143 provided in the rings 134, 138.

The cover 125 is hingedly attached to the base 112 by means of a hinge 150. The hinge 150 comprises a pair of hinge plates 152, 154 fast with the cover 125 and base 112 respectively, a pair of spaced bolts 156 protruding from the plate 154 and provided with aligned eyes through which pivot pins 158, which protrude from the plate 152, pass.

The cross-sectional diameters of the mould cavities may be about 3; 3,3; 4 and 4,4 cm respectively, and the inner diameters of the cavities (when seen in plan view) may be about 65, 53, 39 and 28 cm respectively.

The cover 125 and base 112 are also provided with clamping means (not shown) for clamping them together.

In use, there is introduced into each of the mould cavity portions 114, 116, 118 and 120, a liquid admixture of a polyol blend comprising substantially linear polyester polyols having primary hydroxyl groups as chain terminating groups, short-chain hydroxyl-containing chain extenders, water or another suitable blowing agent, catalysts for accelerating the reactions, and surface-active agents capable of stabilizing the foam structure; methylene chloride as a diluent to impart adequate pourability to the admixture; and an organic polyisocyanate, e.g. a diisocyanate. The components of mixture may be blended together mechanically, e.g. by means of a rotary stirrer, while heating in a water bath.

The admixture may comprise about 100 parts by mass of the polyol blend, 2 to 4 parts by mass methylene chloride, and 70 to 80 parts by mass isocyanate. Sufficient admixture is introduced into each cavity so that solid cores thus formed in the mould cavities will have a moulded density of 300 to 400 kg/m$^2$. Furthermore, the cores have a predominantly closed-cell microcellular structure.

Thereafter, the cover 125 is closed. The mixtures in the cavities are allowed to react and set for about eight minutes. During this period, the mould is turned upside-down at least once to ensure a homogeneous product density. The mould can also be tapped lightly, e.g. with a rubber mallet, to facilitate air escape via the expansion passageways. After the initial setting period, the moulded cores are ejected and allowed to cure for 12 to 24 hours, e.g. to take up sufficient shrinkage. The apparatus 10 heats up to about 40° to 60° C. during use as a result of the exothermic reaction occurring therein during use.

The sizes of the mould cavities will be such that the cores formed will be about 2½% larger, e.g. its diameter 2½% longer, than is required for its eventual use, i.e. as specified by the rim of the wheel of which it will form part. During the curing, the moulding will hence shrink by about 2½%.

In another embodiment (not shown), the mould cavity portions in the base 112 may be about 10% larger, i.e. have 10% larger volume, than those in the cover, which will then be correspondingly smaller.

The mould 100 can be handled manually, e.g. even by unskilled or semi-skilled labour, so that wheel coverings can be moulded therein relatively inexpensively. The wheel coverings thus formed will be used primarily, but not necessarily exclusively, for bicycle wheels, and will be located inside an outer tire.

Figure 9:
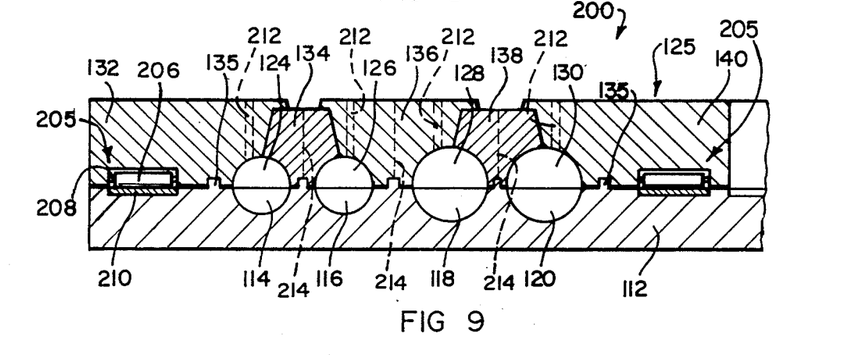
FIG. 9 shows a cross-sectional view similar to FIG. 7 of the mould apparatus according to another embodiment of the second aspect of the invention.

Referring to FIG. 9, reference numeral 200 generally indicates mould apparatus according to a still further embodiment of the second aspect of the invention.

Parts of the apparatus 200 which are the same or similar to those of the apparatus 100, are indicated with the same reference numerals.

The base 112 of the apparatus 200 is rotatable about a central vertical axis relative to its cover 125, which remains stationary. To facilitate smooth rotation, there is provided guide means, generally indicated by reference numeral 205, between the base and the cover.

Each guide means 205 comprises a roller 206, which may be a roller or needle bearing, rotatably mounted on an axle 208 in a recess in the cover 125. The axle 208 extends radially. An annular hard metal guide ring 210, which can for example be of tungsten, is located in a recess in the base 112. The upper surface of the ring 210 is flush with the upper surface of the base. The rollers 206 roll along the ring as the base 112 rotates, thereby guiding it relative to the cover 125.

The base 112 is operatively connected to drive means (not shown) for driving it to rotate. The drive means is synchronized with feed means (not shown) for feeding a predetermined amount of foamable composition into each of the cavities, via a port 212, e.g. by means of nozzles (not shown) connected to the ports. In other words, when it has been determined how much composition must be introduced into each cavity to give a solid core having a desired density, the rotational speed of the base is fixed and the composition injection rate into each cavity is then set so that the predetermined amount of composition will be injected during exactly one revolution of the base. This will also promote a product of uniform density.

In other embodiments (not shown), the rollers can be replaced by ball bearings, or even by merely another guide ring.

In another embodiment, the cover 125 can be split into a plurality of concentric ring-like portions along the broken lines 214 in FIG. 9. Hence, one ring-like portion will comprise the ring 132 and an outer portion of the ring 134. An adjacent ring-like portion will comprise the other inner portion of the ring 134 and an outer portion of the ring 136, etc. Each of these ring-like portions can then be provided with guide means 205 for guiding it relative to the base 112, as well as similar guide means (not shown) guiding it relative to an adjacent ring-like portion.

In use, a predetermined amount of foamable composition will then be introduced into one of the cavities, e.g. the cavity 114, 124 while rotating the base 112 relative to the entire cover 125. When all the composition has been injected into the cavity 114, 124, the ring-like portion 132, 134 as described above, is allowed to rotate with the base 112 so that the cavity portions 114, 124 do not rotate relative to each other, while the cavity portions of the other cavities still rotate relative to each other. The composition can then similarly be introduced into the cavity defined by the portions 116, 126, and so on. This will permit the injection to be effected relatively easily, e.g. the injection can then be effected with a single injection mechanism.

For example, the base 112 can be mounted on a rotatable table (not shown) drivingly connected to an electric motor (not shown), e.g. via a gearbox. The electric motor can be electrically connected to a control panel (not shown). The cover 125 is held stationary, e.g. by being mounted to a stand (not shown). An injection machine (not shown) which can be a known injection machine, is located alongside the stand. The machine has a mixing head, an injection nozzle and electrically operable dispensing means for dispensing composition from the head into the nozzle. The nozzle is releasably attachable to one of the ports 212. The dispensing means is electrically connected to the control panel. On actuating the motor from the control panel, a timing device is actuated. At the same time the dispensing device is actuated so that the motor and dispensing device are actuated for the same period of time. This period of time is set at the time taken to effect one revolution of the base.

To lock a ring-like portion to the base, a pin (not shown) can be inserted through aligned apertures in the ring-like portion and the base. The nozzle can then be re-located in the port 212 of an adjacent ring-like portion.

The foamable compositions hereinbefore described with reference to FIG. 2, can be used in any of the apparatus described with reference to FIGS. 3 to 9 inclusive.

The Applicant has found that it is of great importance, in order to obtain a durable, high quality product, that the density of the moulded solid core should be as uniform as possible throughout the core. Such uniformity is promoted by the various steps provided by the method of moulding as provided by the invention, viz:

distributing the foamable composition evenly throughout the mould cavity;

allowing excess material to escape from the mould cavity at any point along the mould cavity, i.e. via a slit extending along the cavity;

exerting a back pressure on the excess material passing through the slit;

tapping the mould, e.g. with a mallet;

inverting the mould before the material in the mould has set firmly;

admixing the unfoamed and uncured foamable elastomeric composition with a flow agent to facilitate even pouring of the composition into the mould cavity;

moving the upper and lower mould cavity portions relative to each other as the foamable composition is introduced into the cavity.

To achieve good results, the moulded core should be made slightly over-size for the tire it is intended for use with. It will hence have to be compressed to fit inside the tire, and this compressing of the core locates it in position on the rim and gives a stable wheel assembly.

I claim:

1. A method of making a solid core locatable between a wheel rim and a tire fitted to the rim, the method including introducing a foamable composition into a substantially horizontally extending mould cavity having a substantially inflexible mould surface, the cavity being suitably shaped so that a core locatable between a wheel rim and a tire fitted to the rim can be moulded therein, with the introduction of the composition being effected evenly along the entire cavity;

allowing the composition to foam, thereby to fill the mould cavity and form a foamed core;

allowing air and any excess composition to vent from the cavity by means of a vent slit extending along the entire cavity;

allowing the composition in the cavity to set at least partially; and removing the foamed core from the cavity.

2. A method according to claim 1, which includes preventing free passage of excess composition through the vent slit, thereby exerting, along the full length of the vent slit, back pressure on the excess composition.

3. A method according to claim 1, wherein the mould cavity comprises a lower mould cavity portion and an upper mould cavity portion, the introduction of the composition being to the lower mould cavity portion, whereafter the upper mould cavity portion is mated with the lower mould cavity portion, and wherein the mould cavity is inverted prior to firm setting of the composition to promote uniform core density.

4. A method according to claim 1, wherein a plurality of annular mould cavities, located side-by-side with each cavity having a different diameter as well as an upper annular mould cavity portion and an aligned lower annular mould cavity portion, with the centres of the diameter of the upper and lower mould cavity portions hence lying on a axis, are provided, the method then including effecting the introduction of the composition into the lower mould cavity portions simultaneously by means of ports in the upper mould cavity portions, while rotating the lower mould cavity portions about the axis, thereby to effect the composition distribution along the entire lower mould cavity portions.

5. A method of making solid cores locatable between a wheel rim and a tire fitted to the rim, the method including simultaneously introducing a foamable composition into a plurality of spaced annular mould cavities, each cavity being of different diameter and being suitably shaped so that a core locatable between a wheel rim and a tire fitted to the tim can be moulded therein, and each mould cavity comprising an upper mould cavity portion and an aligned lower mould cavity portion, with the centres of the diameters of the upper and lower mould cavity portions hence lying on an axis, and with the composition introduction being effected into the lower mould cavity portions by means of ports in the upper mould cavity portions by rotating the lower mould cavity portions about the axis so that the composition is distributed evenly along the entire lower mould cavity portions;

allowing the composition to foam, thereby entirely to fill the cavities and form a foamed core in each of the cavities;

allowing the composition in the cavities to set at least partially; and removing the foamed cores from the cavities.

6. A method of making a solid core locatable between a wheel rim and a tire fitted to the rim, the method including introducing a foamable composition into a first annular mould cavity portion by means of a port in a second annular mould cavity portion aligned with the first mould cavity portion so that the centres of the diameters of the cavity portions lie on an axis, while moving the first cavity portion relative to the second cavity portion by rotating it about the axis, so that the composition is distributed evenly along the entire second mould cavity portion, the mould cavity portions hence between them defining an annular mould cavity shaped so that a toroidal core locatable between a wheel rim and a tire fitted to the rim can be moulded therein;

allowing the composition to foam, thereby to fill the cavity and form a foamed core;

allowing the composition in the cavity to set at least partially; and removing the foamed core from the cavity.

7. Mould apparatus for moulding a solid core locatable between a wheel rim and a tire fitted to the rim, the apparatus including a substantially inflexible mould body providing an enclosed annular mould cavity shaped so that a solid core locatable between a wheel rim and a tire fitted to the rim, can be moulded therein, with the mould body comprising a lower body portion having a lower annular mould cavity portion, and an upper body portion having an annular mould cavity portion aligned with the lower mould cavity portion so that the upper and lower mould cavity portions together define a mould cavity, with the upper body portion comprising a plurality of abutting concentric sections, and the centres of the diameters of the cavity portions lying on the same axis; and a vent slit extending along the mould cavity along the line of abutment of the sections of the upper body portion.

8. Mould apparatus according to claim 7, wherein back pressure means, for exerting a back pressure on excess moulding composition passing from the cavity through the slit, is provided, the back pressure means comprising a flange extending over the slit, with the flange hence being spaced from the mould cavity and exerting back pressure on the excess moulding composition by preventing free passage of the excess moulding composition through the vent slit.

9. Mould apparatus according to claim 7, wherein a plurality of the mould cavities, arranged in spaced concentric configuration so that they are of differing diameters whose centres all lie on the same axis, are provided in the mould body.

10. Mould apparatus according to claim 7, wherein the upper mould body portion is provided with at least one port extending into each of the mould cavities and through which a moulding composition can be introduced into the mould cavity, and wherein the upper and lower mould body portions are rotatable relative to each other about the axis.

11. Mould apparatus for moulding a solid core locatable between a wheel rim and a tire fitted to the rim, the apparatus comprising a first mould body portion providing a first annular mould cavity portion;

a second mould body portion providing a second annular mould cavity portion aligned with the first mould cavity portion, with the centres of the diameters of the cavity portions lying on the same axis, with the cavity portions defining between them a mould cavity shaped so that a solid core locatable between a wheel rim and a tire fitted to the rim, can be moulded therein, and with the body portions being rotatable with respect to each other about the axis;

feed means in the second mould body portion for feeding foamable material into the first mould cavity portion as the body portions move relative to each other; and a vent slit leading from the cavity.

12. Mould apparatus for moulding solid cores locatable between a wheel rim and a tire fitted to the rim, the apparatus including a plurality of annular mould cavities, arranged in spaced concentric configuration so that they are of differing diameter with the centres of their diameters lying on the same axis, with each cavity shaped so that the solid core locatable between a wheel rim and a tire fitted to the rim can be moulded therein, and with each mould cavity comprising a lower annular mould cavity portion, and an upper annular mould cavity portion aligned with the lower mould cavity portion so that the upper and lower mould cavity portions together define a mould cavity; and a vent slit extending along each of the cavities.

* * * * *